United States Patent
Yamamoto

[19]

[11] Patent Number: 5,991,038
[45] Date of Patent: Nov. 23, 1999

[54] SURFACE PATTERN UNEVENNESS DETECTING METHOD AND APPARATUS

[75] Inventor: Shigeru Yamamoto, Tokyo, Japan

[73] Assignee: ODP Co., Ltd., Tokyo, Japan

[21] Appl. No.: 09/116,111

[22] Filed: Jul. 15, 1998

[51] Int. Cl.$^6$ ................................................. G01B 11/30
[52] U.S. Cl. .................... 356/371; 356/237.2; 356/446
[58] Field of Search .......................... 356/237.1, 237.2, 356/237.3, 237.4, 237.5, 394, 371, 445–448; 250/559.44, 559.09

[56] References Cited

U.S. PATENT DOCUMENTS

| | | |
|---|---|---|
| 4,954,723 | 9/1990 | Takahashi et al. ...................... 356/446 |
| 4,983,842 | 1/1991 | Takamine ................................ 356/446 |
| 5,264,912 | 11/1993 | Vaught et al. ........................ 356/237.5 |
| 5,763,123 | 6/1998 | Shishido et al. ......................... 356/394 |

*Primary Examiner*—Hoa Q. Pham
*Attorney, Agent, or Firm*—Akin, Gump, Strauss, Hauer & Feld, L.L.P.

[57] ABSTRACT

The present invention provides an apparatus and associated method of detecting pattern unevenness in the surface of an object. The apparatus includes a light source for irradiating surfaces of an object and a line sensor camera for detecting unevenness in the surfaces. The method comprises the steps of irradiating a light onto a surface having a pattern formed on the surface thereof, and observing the scattered light from the pattern edge portions, thereby inspecting pattern unevenness by way of the line sensor camera.

2 Claims, 8 Drawing Sheets

$90° > \theta S \geq \theta$

SURFACE PATTERN UNEVENNESS DETECTING METHOD AND APPARATUS

BACKGROUND OF THE INVENTION

The present invention relates to a method and an apparatus for detecting surface pattern unevenness generally by the use of a line sensor camera. More particularly, the invention relates to surface pattern unevenness detecting method and apparatus which permit effective use in the manufacture of a liquid crystal display panel (liquid crystal TFT substrate) or a polysilicon TFT substrate.

When manufacturing a liquid crystal display panel (liquid crystal TFT substrate), for example, it is necessary to apply a photolithographic process comprising the steps of exposing a substrate comprising a glass support, a metal (Cr) layer and a resist layer to a prescribed image by means of an exposure unit, and then, developing the thus exposed resist layer, thereby preparing a prescribed resist pattern.

At this point, a visual inspection is carried out by the use of a wide light source to check whether or not operation of the exposure unit is normal. One of the particularly important inspection items is the inspection of exposure unevenness on the resist layer caused by an abnormal focusing of the exposure unit. In the conventional art, it is difficult to automatically obtain an observation image of the resist pattern on the substrate surface. It is therefore the conventional practice to determine the extent of exposure unevenness by irradiating a monochromatic light source on the substrate and visually watching the reflected light from the resist edge of the resist pattern. According to this practice, however, the functional inspection by manual operation results in considerable dispersions, and further, the recent tendency of TFT substrates toward a larger size is making it difficult to carry out a visual inspection. There is therefore an increasing demand for automation of the exposure unevenness inspection.

Under the circumstances as described above, it is known to obtain an image on a substrate 1 which is a stationary object of inspection by means of a two-dimensional CCD sensor camera 10 as shown in FIG. 1. In this configuration, an image is obtained by means of the two-dimensional CCD sensor camera 10 arranged diagonally above an end of the substrate 1 by irradiating a light from a light source 20 from diagonally above the other end of the substrate 1 having a resist pattern on the surface thereof via a Fresnel lens 21 and a white scattering plate 22 onto the substrate 1.

However, because this configuration permits observation of exposure unevenness only within a tight angular range, while satisfactory observation is possible for the center portion of the substrate image 1G substantially corresponding to the center portion of the monitor 100, sufficient focusing is unavailable at top and bottom end portions. For a larger-sized substrate 1 to be inspected, therefore, it becomes impossible to observe unevenness throughout the entire surface of the substrate 1.

In order to obtain satisfactory focusing for the entire screen, a conceivable way is to include the image forming plane of a sensor camera 10 having a lens system 11 and a sensor 12 by an angle ($\alpha$) in a direction in which the light receiving plane of the sensor 12 leaves the substrate 1 to be inspected, as shown in FIG. 2. This measure is not however acceptable because distortion at top and bottom of the screen of the monitor 100 becomes larger, as shown in FIG. 3.

BRIEF SUMMARY OF THE INVENTION

The present invention has therefore an object to provide a method and an apparatus of detecting surface pattern unevenness of an object to be inspected receiving light irradiation, preferably by the use of a line sensor.

Another object of the invention is to provide surface pattern unevenness detecting method and apparatus which are effectively applicable particularly for inspecting a resist pattern in the manufacture of a liquid crystal display panel (liquid crystal TFT substrate), permit inspection not only of exposure unevenness caused by an exposure unit, but also of defects in a resist pattern, and further, allow detection of irradiation unevenness in laser anneal upon manufacture of a polysilicon TFT substrate.

The foregoing objects can be achieved by the use of the surface pattern unevenness detecting method and apparatus of the invention. In summary, the present invention relates to a surface pattern unevenness detecting method for inspecting pattern unevenness by irradiating a light onto a substrate having a pattern formed thereon, and observing the scattered light from an edge portion of the pattern through detection by means of a CCD line sensor having a sensitivity of at least 100 V/$\mu$ J/cm$^2$ near the peak quantum efficiency (700 nm). For example, a TDI (time domain integration) type sensor is suitably applicable as the aforesaid line sensor.

In the invention, the angle ($\theta$ S) between the light receiving plane of the foregoing CCD line sensor and the optical axis of the lens system condensing the scattered light onto the light receiving plane is equal to, or larger than, the angle ($\theta$) between the optical axis and the substrate, and is smaller than 90°, i. e., 90°>$\theta$ S$\geq$$\theta$.

According to another aspect of the invention, there is provided a surface pattern unevenness detecting apparatus comprising a light source which is arranged diagonally above a side of the substrate and irradiates a light onto the substrate at a prescribed first angle ($\theta_1$) to the horizontal plane of the substrate, and first sensor camera means which detects pattern unevenness by observing the light entering sensor means at second angle ($\theta_2$) to the horizontal plane of the substrate after being scattered at an edge portion of the pattern on the substrate surface, wherein the aforesaid second angle ($\theta_2$) is larger than the first angle ($\theta_1$), i. e. $\theta_2$>$\theta_1$.

Further, the apparatus of the invention may be provided with second sensor camera means which inspects defects in the pattern on the substrate surface by the use of a coaxial dropping illumination by a half-mirror arranged adjacent to the aforesaid light source.

In the apparatus of the invention, the foregoing first and second camera means should preferably have a CCD line sensor having a sensitivity of at least 100 V/$\mu$ J/cm$^2$ near the peak quantum efficiency (700 nm), or more preferably, the CCD line sensor is a time domain integration (TDI) type sensor.

Also in the apparatus of the invention, the angle ($\theta$S) between the light receiving plane of the CCD line sensor and the optical axis of a lens system condensing the scattered light on the light receiving plane should preferably be equal to, or larger than, the angle ($\theta$) between the optical axis and the substrate, and is smaller than 90°, i. e., 90°>$\theta$ S$\geq$$\theta$.

According to an embodiment of the apparatus of the invention, the apparatus may have a configuration formed by attaching a fixed link to the substrate supporting base mounting the substrate, forming a parallel movement mechanism having a rocking link rocking with the both ends of the fixed link as fulcra, and attaching the sensor of the first sensor camera means to a movable link provided opposite to the fixed link of the parallel movement mechanism. According to another embodiment, the apparatus may be formed by rockably attaching an end of a long and slender support to the substrate supporting base mounting the substrate, rotatably providing pulleys at the end of the long and slender support attached to the substrate supporting base and the other end thereof, forming a parallel movement mechanism by connecting the both pulleys with a belt, and attaching the sensor of the first sensor camera means to the pulley at the other end of the parallel movement mechanism.

DETAILED DESCRIPTION OF THE INVENTION

The surface pattern unevenness detecting method and apparatus of the invention will be described further in detail with reference to the drawings. The invention is applicable effectively for detection of exposure unevenness caused by an exposure unit in the manufacture of, for example, a liquid crystal TFT substrate, and further, for detection of irradiation unevenness in laser anneal when manufacturing a polysilicon TFT substrate. Embodiments described below will cover cases of the application of the invention for detection of exposure unevenness caused by an exposure unit upon manufacture of a liquid crystal TFT substrate.

Embodiment 1

Figure 1:
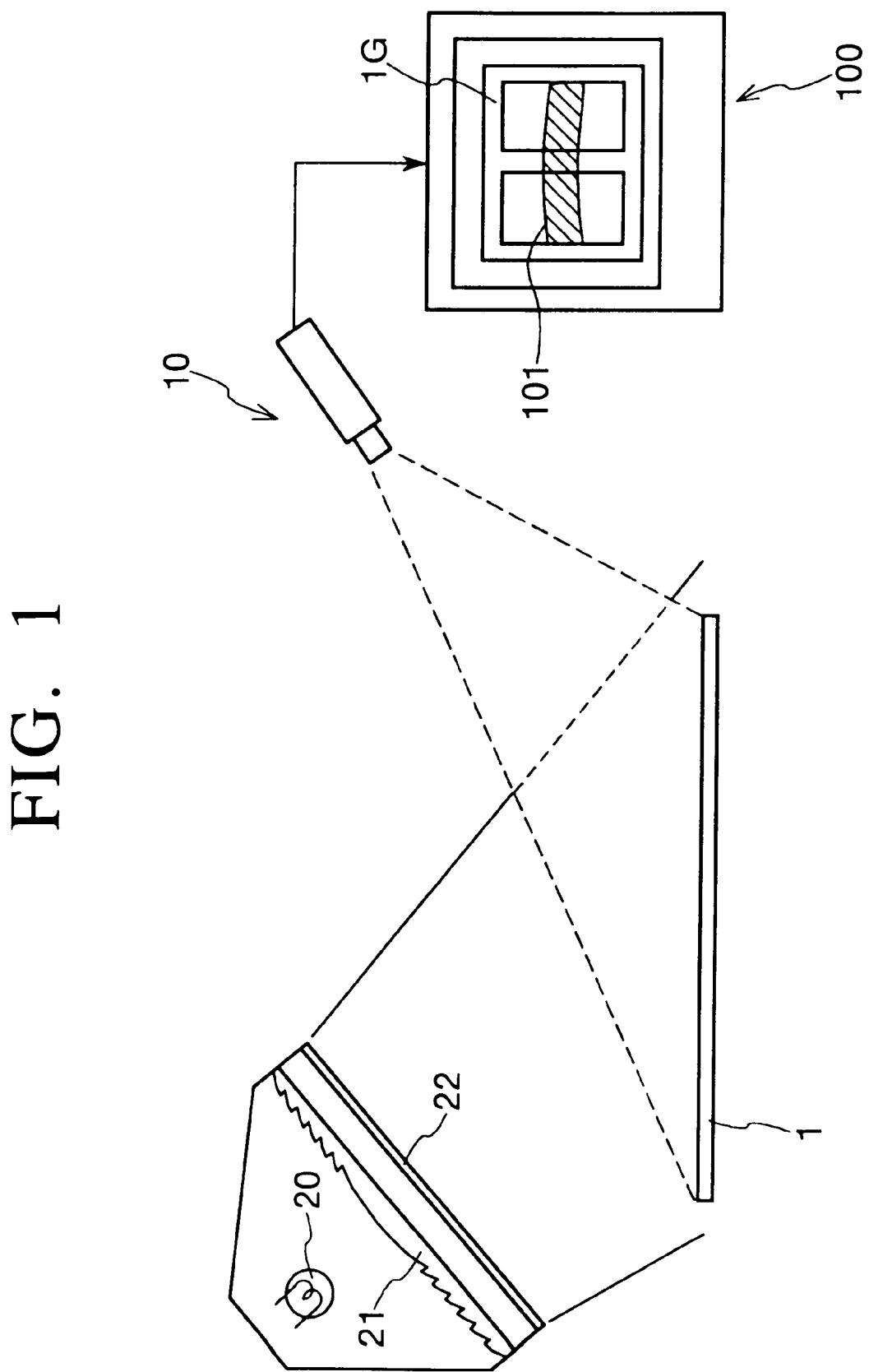
FIG. 1 is a schematic configuration diagram of a detecting apparatus illustrating a conventional image acquiring method using a two-dimensional CCD sensor.
Figure 2:
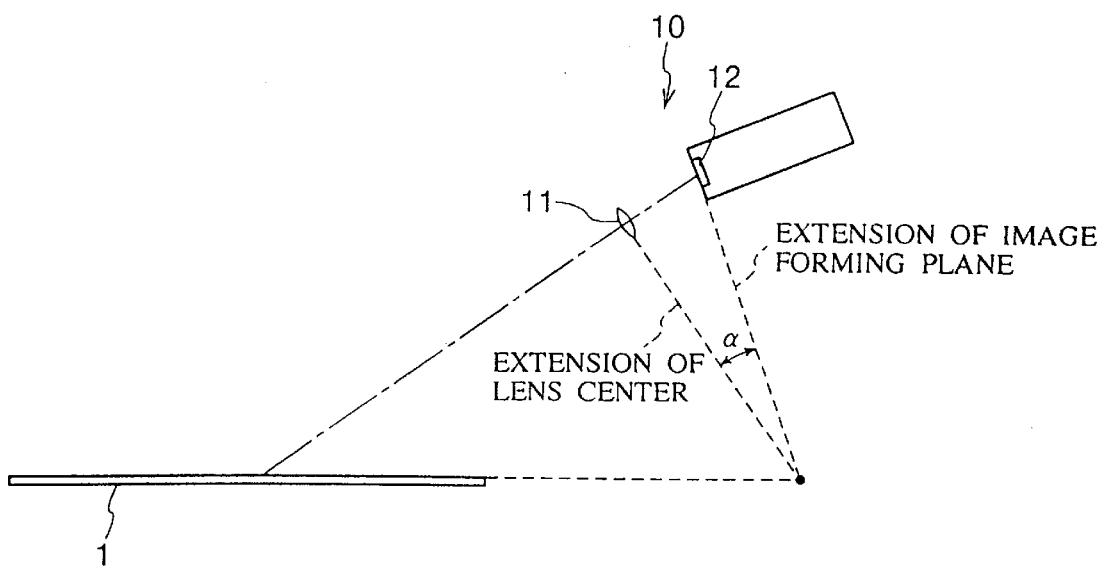
FIG. 2 is a descriptive view of focusing when a sensor is inclined.
Figure 3:
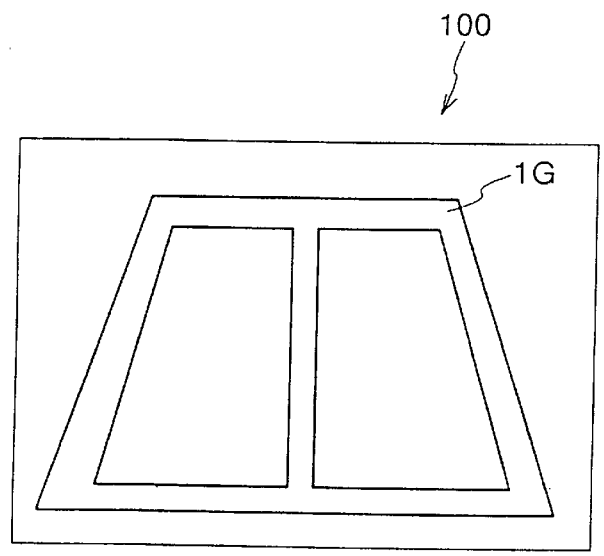
FIG. 3 is a descriptive view of a monitor screen when the sensor is inclined.
Figure 4:
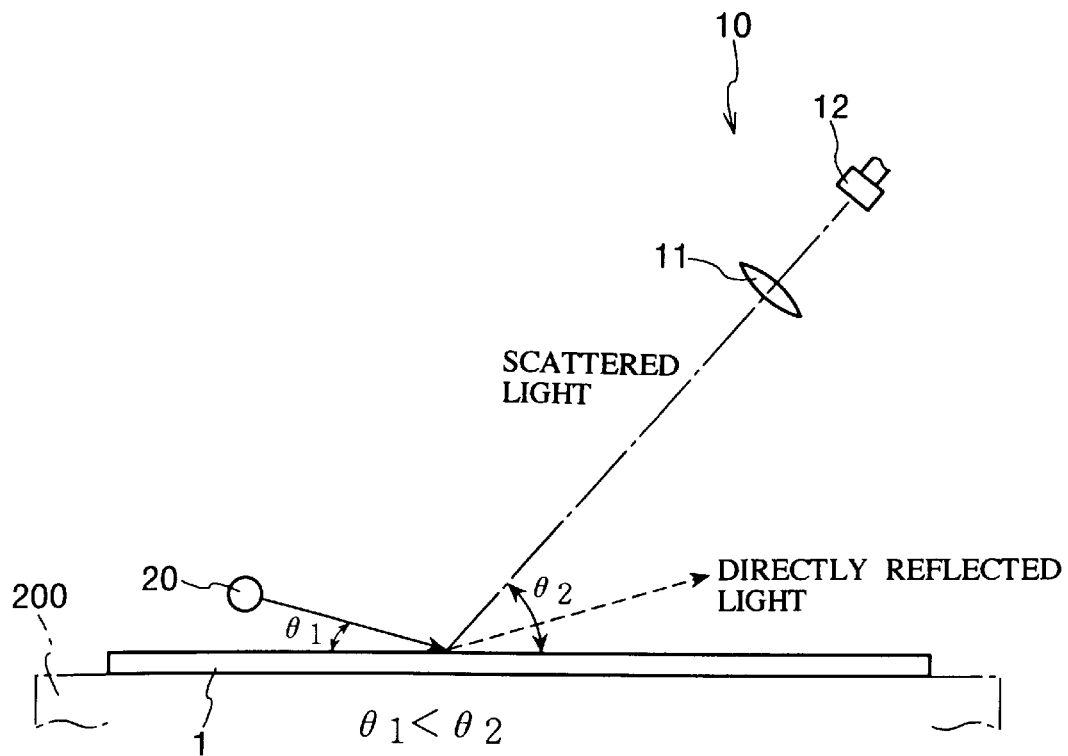
FIG. 4 is a descriptive view of the surface pattern unevenness detecting method of the invention.

First, the principle of exposure unevenness inspection of the invention will be described with reference to FIG. 4. More specifically, according to the invention, upon manufacture of a liquid crystal TFT substrate, a substrate I having a resist pattern formed on the surface thereof through a photolithographic process is placed horizontally on a substrate supporting base 200 of the inspecting apparatus. That is, in the photolithographic process, a prescribed image is exposed by an exposure unit on a resist layer of the substrate comprising a glass support, a metal (Cr) layer, and the resist layer, and then, the thus exposed resist layer is developed, thus forming a prescribed resist pattern on the substrate surface. The edge portion shape varies in diverse manner under the effect of a focusing error caused by film thickness unevenness or particles entangled under the resist layer.

A light source 20 is arranged above a side of the substrate 1 placed on the substrate supporting base 200, and sensor camera means 10 having a lens optical system 11 and a sensor 12 is arranged above the other side thereof. The light source 20 irradiates a light at a prescribed first angle $(\theta_1)$ to the horizontal plane of the substrate 1. A long and slender light source known as a wide light source (linear light source) such as a linear fluorescent lamp is suitable as the light source 20. The light source 20 should suitably be arranged in the width direction of the substrate, i.e., so as to extend from near to far sides in FIG. 4. Although there is no particular restriction on the wavelength of the light source 20, it should preferably have a wavelength within a range of from 600 to 900 nm in relation to sensor camera means 10 as described later. A CCD line sensor may be used as the sensor 12.

When a light is irradiated from the light source at a first angle $(\theta_1)$ onto a resist pattern on the surface of the substrate 1 in the foregoing configuration, the light entering the upper surface of the resist pattern formed in parallel with the horizontal plane of the substrate is reflected at a prescribed angle. Pressure of unevenness on the substrate surface leads to a different manner of scattering at edge portions of the resist pattern. According to the invention, the configuration is such that the sensor camera means 10 observes, not the light reflected directly from the flat surface portion of the resist pattern, but the scattered light which has been scattered at the edge portion and enters the sensor 12 at a second angle $(\theta_2)$. From the point of view of collecting the scattered light, the second angle $(\theta_2)$ may be smaller than the first angle $(\theta_1)$. In order to minimize out-of-focus unevenness and obtain a satisfactory image, however, the second angle $(\theta_2)$ should preferably be larger than the first angle $(\theta_1)$, i.e., $\theta_2 > \theta_1$.

In the present invention, as described above, it is possible to detect a change in the edge portion by catching only the scattered light from the edge portion of the resist pattern by means of the sensor camera means 10 having the CCD. line sensor 12. However, since the scattered light is far weaker than the direct reflected tight, it is desirable to use, as the line sensor 12, a time-domain integration (TDI) type sensor having a high sensitivity of at least 100, for example, 400 V/$\mu$ J/cm$^2$ near the peak quantum efficiency (700 nm).

Figure 5:
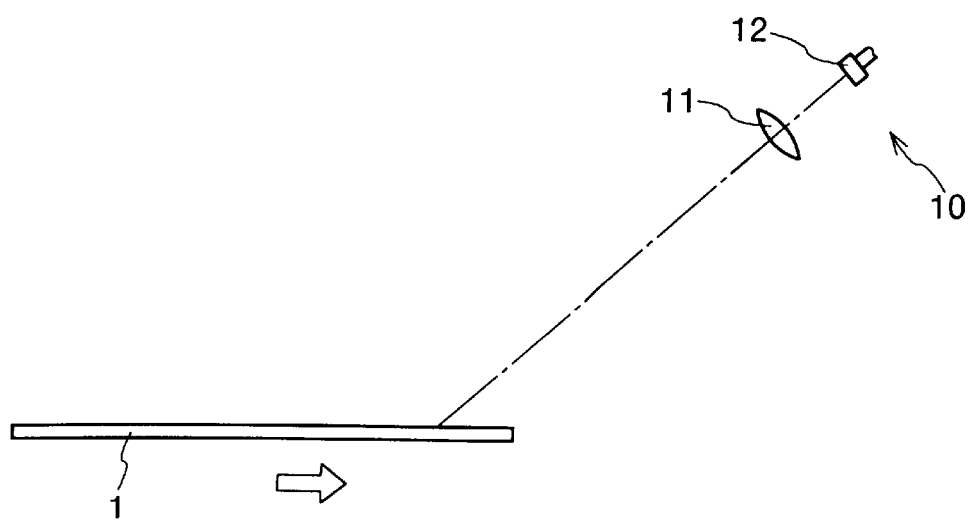
FIG. 5 is a descriptive view of image acquisition of the sensor for an inclined object of inspection.
Figure 6:
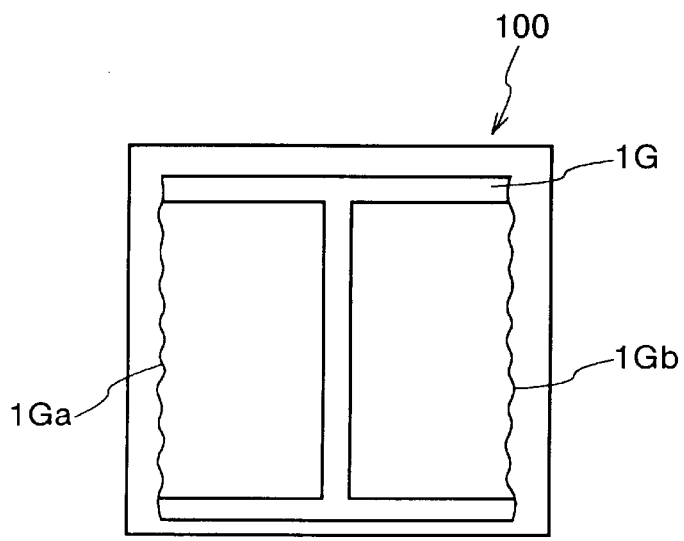
FIG. 6 illustrates a monitor screen when observing an inclined object of inspection through sensor camera means.
Figure 7:
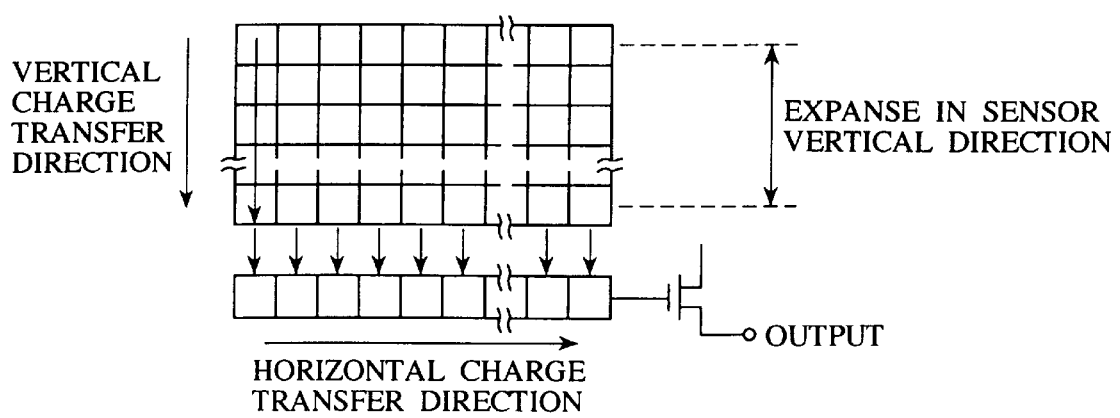
FIG. 7 illustrates the structure of a TDI sensor.

On the other hand, the sensor camera means 10 having, for example, a TDI sensor is usually arranged in parallel with the lens optical system 11 and the sensor 12, as shown in FIG. 5. Therefore, when taking an image of the substrate 1, an object of inspection arranged diagonally to the sensor camera 10 and displacing in the arrow direction, out-of-focus unevenness occurs at the both ends 1G$a$ and 1G$b$ of the image 1G as shown in FIG. 6.

Now, causes of such out-of-focus unevenness and solving means will be described below. The TDI sensor 12, which is a one-dimensional line sensor, has an expanse also in a direction at right angles to the scanning direction of sensor data for accumulating light energy.

Figure 8:
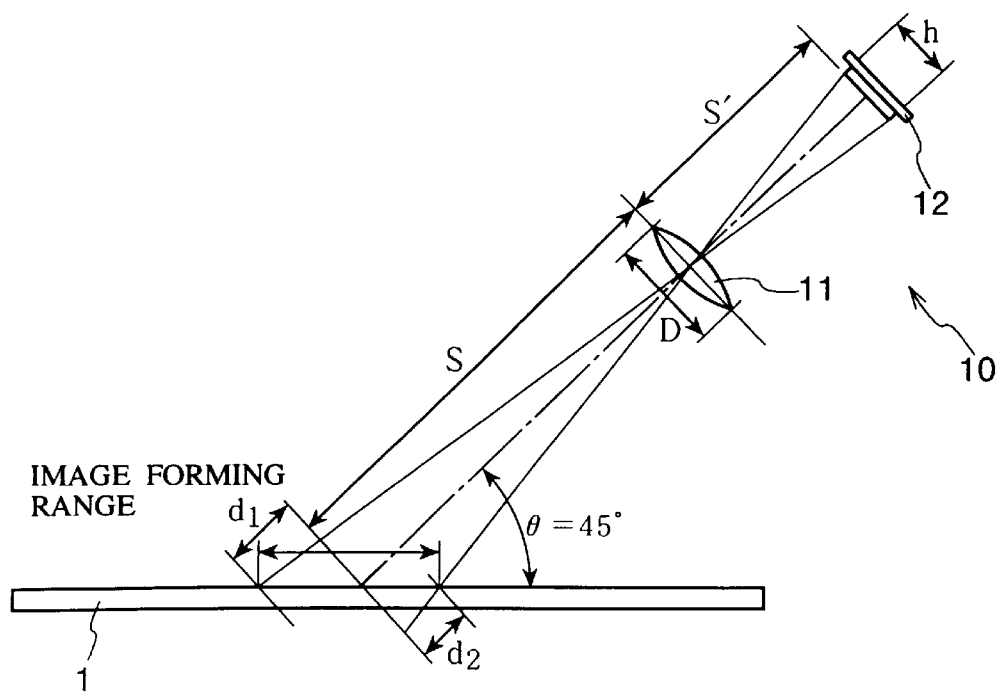
FIG. 8 is a descriptive view of the expanse of a point image when observing the inclined object of inspection through the sensor camera means.

As shown in FIG. 8, therefore, when the sensor camera means 10 is arranged diagonally to the substrate to be inspected which is an object 1 of inspection, and if the lens optical system 11 and the sensor 12 are arranged in parallel, the distance to the object 1 differs between the upper and the lower ends of the sensor 12, so that focusing at the center of the sensor results in out-of-focus unevenness at the upper and the lower ends. The extent of out-of-focus unevenness is such that, when using a commercially available F2.8–60 mm lens as the lens system 11, the expanse of point images on the sensor 12 surface covers about two picture elements on the assumption of a sensor pixel size of 13 μm.

Assuming, in FIG. 8 a sensor vertical width h of 1.2 mm, a distance S to the object 1 of 600 mm, and an angle (θ) between the optical axis and the object 1 of 45°, then, the distance S' between the lens system and the sensor light receiving plane would be 66.7 mm, and since h<<S:

$$d1 \approx d2 \approx 5.4 \text{ mm, and}$$

D=21 mm, and the expanse of point images at top and bottom of the sensor would be as follows:

$$21 \div 66.7 \times \left( \frac{1}{\frac{1}{60} - \frac{1}{600}} - \frac{1}{\frac{1}{60} - \frac{1}{605.4}} \right) = 0.021 \text{ (mm)} = 21 \text{ (μm)}$$

That is, assumption of a sensor pixel size of 13 μm results in an expanse of point images on the sensor surface of about two picture elements.

Figure 9:
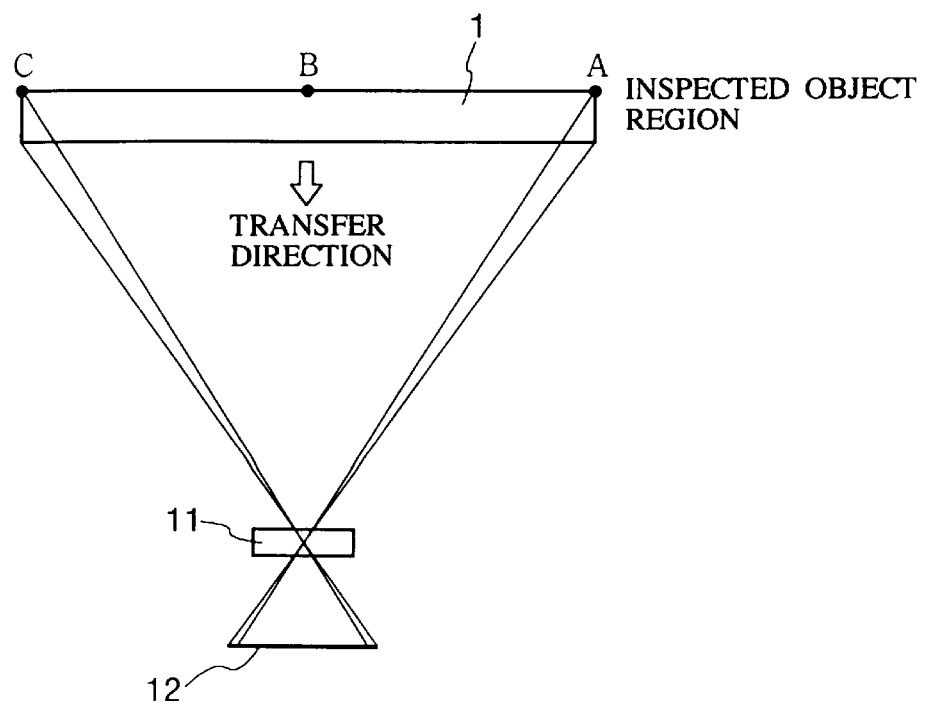
FIG. 9 is a descriptive view of the expanse of the point image when observing the inclined object of inspection through the sensor camera means as viewed from above.
Figure 10:
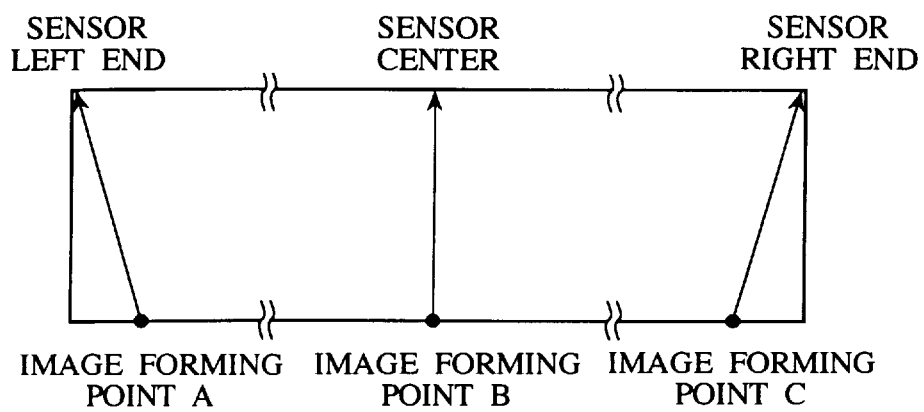
FIG. 10 is a descriptive view illustrating displacement of points formed on the sensor when observing the inclined object of inspection through the sensor camera means.
Figure 11:
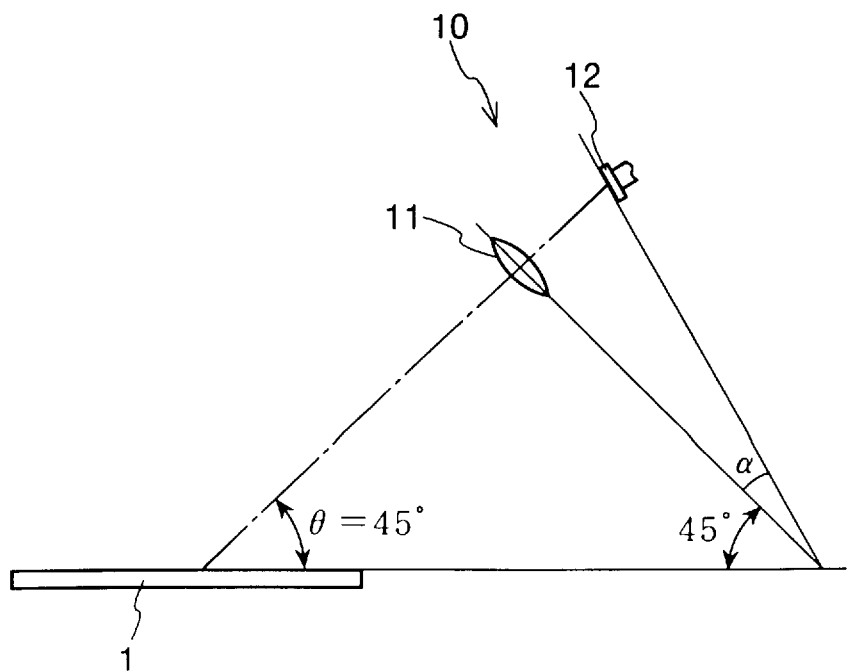
FIG. 11 is a descriptive view of an optical arrangement free from out-of-focus unevenness in the up/down direction on the sensor surface when observing the inclined object of inspection through the sensor camera means.
Figure 12:
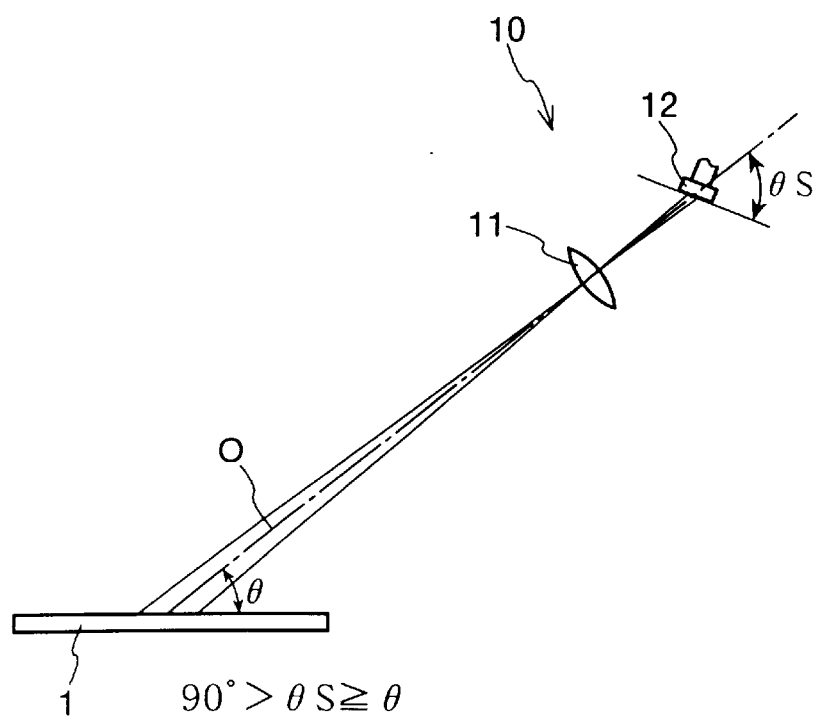
FIG. 12 is a descriptive view of the optimum optical arrangement free from out-of-focus unevenness when observing the inclined object of inspection through the sensor camera means.

When shooting an image of the object 1 from a diagonal position, distortion of the image is produced at the right and left ends of the sensor 12, and the point image available through vertical scanning displaces diagonally on the sensor surface, as shown in FIGS. 9 and 10. This shift in the transverse direction is for about 18 picture elements when using an optical system shown in FIG. 8. As a result of this diagonal shift, the image is almost out of focus at the right and left ends of the sensor. The amount of out-of-focus unevenness caused by this phenomenon is larger than that of focal positional shift as described above.

The foregoing focal positional shift shown in FIG. 8 may be solved by including the sensor 12 by an angle (α) in the direction leaving the substrate (object) 1. According to this method, however, the shape distortion of the image of the object 1 formed on the light receiving plane of the sensor 12 becomes more serious than in the aforesaid case, resulting in more serious out-of-focus unevenness at the right and left ends of the sensor 12 than in the parallel arrangement with the lens system 11: an amount of about 22 picture elements in the case of α=15°.

In a preferred embodiment of the invention, therefore, the TDI sensor 12 is arranged in a direction slightly closer to the direction in parallel with the lens system 11 than the angle in parallel with the object 1, and an angle is set at a minimum balance position of out-of-focus unevenness due to the two above-mentioned principles caused at top and bottom ends and right and left ends of the sensor 12.

More specifically, the angle (θ S) between the light receiving plane of the CCD line sensor 12 and the optical axis θ of the lens system 11 condensing the scattered light onto the light receiving plane should be equal to, or larger than, the angle (θ) between the optical axis O and the substrate 1, and smaller than 90°, i.e., 90°>θS≧θ.

By adopting the configuration as described above, it is possible to obtain satisfactory results even when using a commercially available lens as described above as the lens system 11 without correcting image shifts at the both ends of the sensor surface by a complicated lens system.

Embodiment 2

Figure 13:
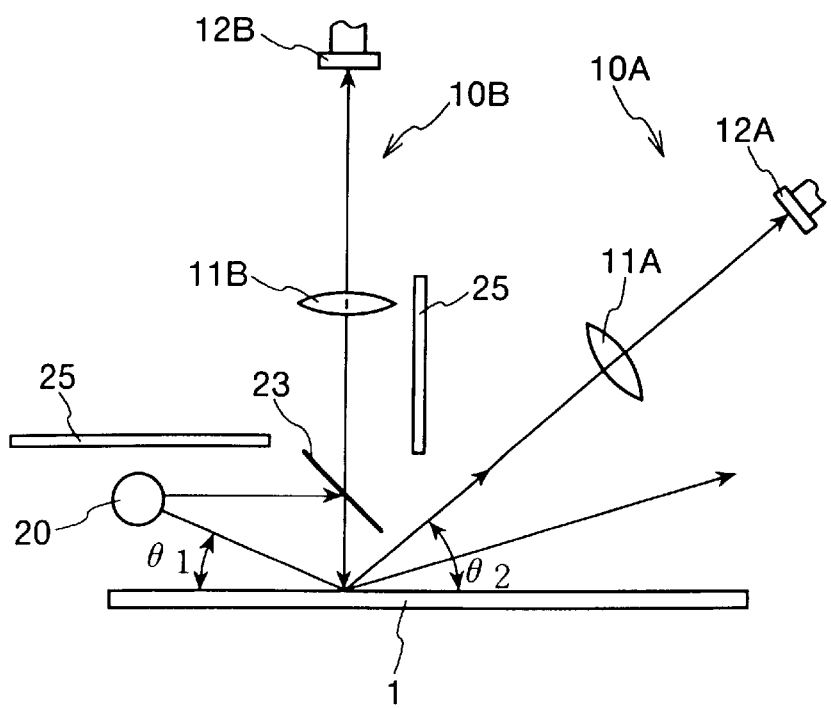
FIG. 13 is a schematic configuration diagram of the detecting apparatus capable of simultaneously detecting exposure unevenness and pattern defects of the invention.

FIG. 13 illustrates another embodiment of the invention. According to this embodiment, it is possible to detect exposure unevenness caused by an exposure unit upon forming a resist pattern, and further, to finely inspect the shape of the resist pattern, i.e., defects in the pattern.

In other words, while exposure unevenness inspection requires a light source 20 irradiating a light diagonally, it is desirable to use a coaxial dropping illumination in a shape defect inspection of a resist pattern.

According to this embodiment, therefore, as in Example 1 described above with reference to FIG. 4, as shown in FIG. 13, a light source 20 serving as a linear type fluorescent lamp is arranged above a side of the substrate 1, and first sensor camera means 10A having a lens optical system 11A and a sensor 12A is arranged above the other side. The light source 20 irradiates a light at a prescribed angle ($\theta_1$) to the horizontal plane of the substrate 1. The first sensor camera means 10A has such a configuration that, not a light reflected directly from the flat portion of the resist pattern, but a scattered light caused at the edge portion and entering the sensor 12 at a second angle ($\theta_2$) is observed, as described as to Example 1. As described above, the second angle ($\theta_2$) should preferably be larger than the first angle (θ), i.e., $\theta_2 > \theta_1$.

In this embodiment, furthermore, a half-mirror 23 is arranged adjacent to the light source 20, and second sensor camera means 10B is arranged vertically above the half-mirror 23. This second sensor camera means 10B may as well be configured in the same manner as in the first sensor camera means 10A: it has a lens system 11B and a sensor 12B, and horizontally scans the object 1. A douser 25 is arranged at an appropriate position.

Embodiment 3

According to the invention, as described above in Examples 1 and 2, when inspecting exposure unevenness with the sensor camera means 10 having a line sensor 12 such as a TDI sensor, it is desirable to observe the scattered light entering the sensor camera means 10 at a second angle ($\theta_2 > \theta_1$) to the horizontal plane. In this case, it may be necessary to adjust the incident angle $\theta_2$ to the sensor camera means 10, depending upon process conditions of the object.

Figure 14:
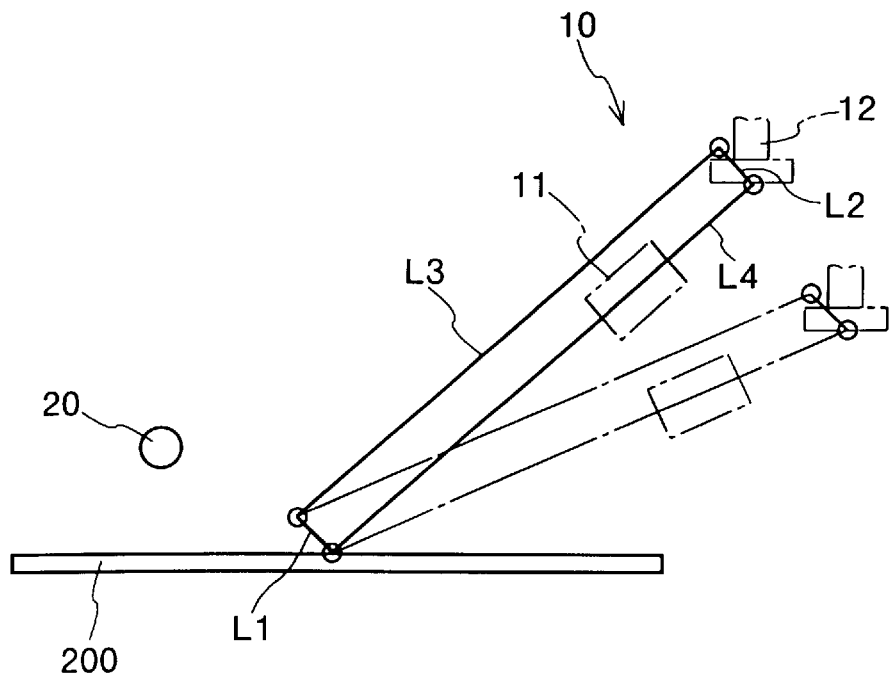
FIG. 14 is a descriptive view of an embodiment in which the sensor is supported by the parallel movement mechanism.

In this embodiment, as shown in FIG. 14, the sensor camera means 10 is attached to a parallel movement mechanism formed by the utilization of four-bar linkage of a parallelogram. More specifically, the parallel movement mechanism has short links L1 and L2 and long links L3 and L4, opposite to each other, respectively. The fixed link serving as the short link L1 is fixed to the substrate supporting base 200 for mounting the object of inspection, i.e., the substrate. One-side ends of the long links L3 and L4 are shaft-rockably attached to the both ends of the fixed link L1, and the short movable link L2 is shaft-rockably attached to the other-side ends of the rocking links L3 and L4.

The sensor 12 of the sensor camera means 10 is secured at a prescribed position of the aforesaid movable link L2. The light receiving plane of the sensor 12 is arranged at a prescribed angle to the plane of the substrate supporting base 200. Even when the parallel movement mechanism rocks around the axial point of the fixed link L1, therefore, the movable link L2 displaces always while keeping the parallelism with the fixed link L1. As a result, the light receiving plane of the sensor 12 displaces while always maintaining a certain angle relative to the plane of the substrate supporting base 200. The lens system 11 of the sensor camera means 10 is attached, for example, to the link L4.

By adopting the foregoing configuration, the incident angle ($\theta_2$) into the sensor camera means can be easily changed while keeping the optimum angle between the object of inspection (substrate) 1 and the sensor 12 leading to a satisfactory image.

Figure 15:
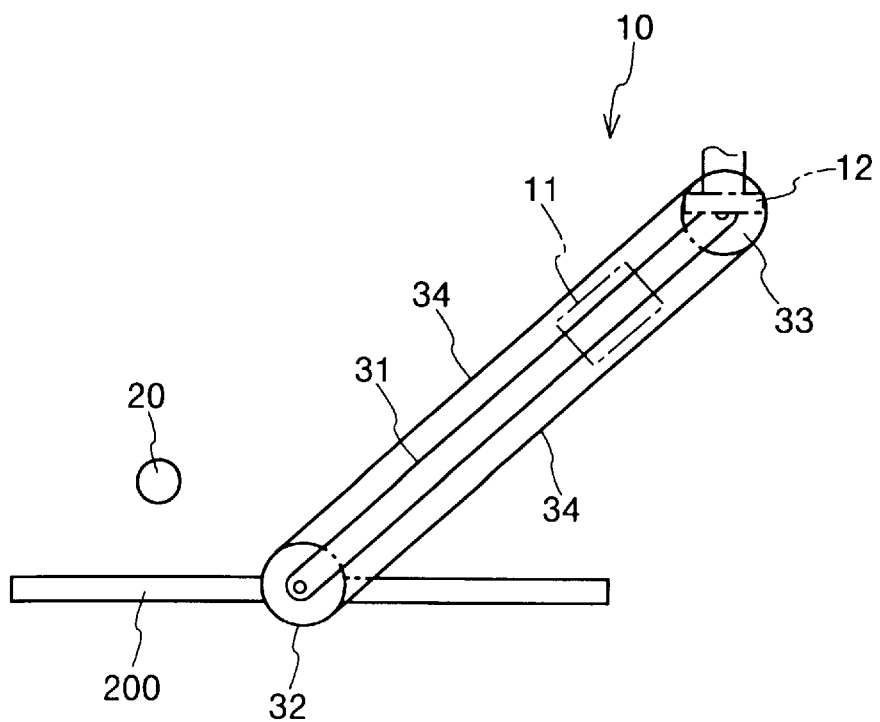
FIG. 15 is a descriptive view of an embodiment in which the sensor is supported by another parallel movement mechanism.

As an alternative, a parallel movement mechanism based on a wrapping intermediate link as shown in FIG. 15 may also be adopted. More specifically, the applicable configuration is such that pulleys 32 and 33 rotatably provided on the both sides of the long and slender support 31: one of the pulleys 32 being attached rotatably to the substrate supporting base 200 and the sensor 12 being fixed to the other pulley 33, and the both pulleys are connected with a not-expansible belt 34 such as a metal belt.

According to this embodiment, the light receiving plane of the sensor 12 displaces always keeping a constant angle relative to the plane of the substrate supporting base 200 even when the support 31 is inclined by a prescribed angle relative to the substrate supporting base 200. The lens system 11 of the sensor camera means 10 may be attached, for example, to the long and slender support 31.

Also in this embodiment, by adopting the foregoing configuration, the incident angle ($\theta_2$) into the sensor camera means can be easily changed while keeping the optimum angle between the object of inspection 1 and the sensor 12 leading to a satisfactory image.

In the above-mentioned embodiments, the invention has been described in association with detection of exposure unevenness caused by an exposure unit in the manufacture of a liquid crystal display panel (liquid crystal TFT substrate). The invention is effectively applicable also for inspecting pattern unevenness, through observation of the pattern edge portions, such as irradiation unevenness in laser anneal upon manufacture of a polysilicon TFT substrate, i.e., unevenness produced after irradiation of a laser onto the silicon film, and advantages similar to those described above are available.

As described above, the surface pattern unevenness detecting method and apparatus of the invention have a configuration in which pattern unevenness is inspected through observation of the scattered light from pattern edges by means of a CCD line sensor having a sensitivity of at least 100 V/$\mu$J /cm$^2$ near a peak quantum efficiency (700 nm) by irradiating a light onto a substrate having a pattern formed on the surface thereof. It is therefore possible to effectively inspect surface pattern unevenness of an object receiving irradiation of light, preferably with the use of a line sensor camera. Particularly, the present invention is effectively applicable to inspection of a resist pattern in the manufacture of a liquid crystal display panel (liquid crystal TFT substrate), permitting inspection of not only exposure unevenness caused by an exposure unit, but also resist pattern defects. It is further effectively applicable for the inspection of irradiation unevenness in laser anneal when manufacturing a polysilicon TFT substrate and the like.

I claim:

1. A surface pattern unevenness detecting apparatus comprising a light source which is arranged above one side of a substrate and irradiates light onto the substrate at a prescribed first angle ($\theta_1$) to the horizontal plane of the substrate, first camera means arranged above the other side of the substrate which inspects pattern unevenness by observing light entering a sensor at a second angle ($\theta_2$) to the horizontal plane of the substrate after being scattered at a pattern edge portion of the substrate surface, a fixed link attached to a substrate supporting base for mounting the substrate, and a parallel movement mechanism provided with a rocking link, rocking with the both ends of the fixed link forming a fulcrum, the sensor of said first camera means being attached to a movable link opposite to said fixed link of the parallel movement mechanism wherein said second angle ($\theta_2$) is larger than the first angle ($\theta_1$), i.e., $\theta_2 > \theta_1$.

2. A surface pattern unevenness detecting apparatus comprising a light source which is arranged above one side of a substrate and irradiates light onto the substrate at a prescribed first angle ($\theta_1$) to the horizontal plane of the substrate, first camera means arranged above the other side of the substrate which inspects pattern unevenness by observing light entering a sensor at a second angle ($\theta_2$) to the horizontal plane of the substrate after being scattered at a pattern edge portion of the substrate surface, a long and slender support having one end which is rockably attached to a substrate supporting base which mounts the substrate, a pulley which is rotatably attached to each of the one end of said long and slender support and the other end whereby a parallel movement mechanism is formed by connecting both pulleys with a belt, and the sensor of said first camera means is attached to the pulley at said other end of the parallel movement mechanism wherein said second angle ($\theta_2$) is larger than the first angle ($\theta_1$), i.e., $\theta_2 > \theta_1$.

* * * * *